(12) United States Patent
Hogendoorn et al.

(10) Patent No.: US 12,405,144 B2
(45) Date of Patent: Sep. 2, 2025

(54) MAGNETIC-INDUCTIVE FLOWMETER

(71) Applicant: KROHNE AG, Basel (CH)

(72) Inventors: Cornelis Johannes Hogendoorn, Spijk (NL); Arthur den Haan, Leiden (NL)

(*) Notice: Subject to any disclaimer, the term of this patent is extended or adjusted under 35 U.S.C. 154(b) by 319 days.

(21) Appl. No.: 18/340,336

(22) Filed: Jun. 23, 2023

(65) Prior Publication Data
US 2023/0417586 A1    Dec. 28, 2023

(30) Foreign Application Priority Data

Jun. 23, 2022  (DE) .................. 10 2022 115 650.8

(51) Int. Cl.
*G01F 1/58*   (2006.01)
*G01F 25/10*  (2022.01)

(52) U.S. Cl.
CPC .............. G01F 1/588 (2013.01); G01F 25/10 (2022.01)

(58) Field of Classification Search
CPC .................................. G01F 25/10; G01F 1/588
USPC ..................................................... 73/861.12
See application file for complete search history.

(56) References Cited

U.S. PATENT DOCUMENTS

| | | | |
|---|---|---|---|
| 4,726,236 A * | 2/1988 | Wada ........................ | G01F 1/60 73/861.12 |
| 4,727,754 A | 3/1988 | Ruckel | |
| 4,736,635 A * | 4/1988 | Murase ................... | G01F 1/586 73/861.15 |
| 2014/0020477 A1 * | 1/2014 | van Willingen ........ | G01F 1/588 73/861.12 |
| 2014/0083199 A1 * | 3/2014 | Rogers ..................... | G01F 1/588 73/861.12 |
| 2017/0131131 A1 | 5/2017 | Keech | |

FOREIGN PATENT DOCUMENTS

| | | |
|---|---|---|
| DE | 102014113404 A1 | 3/2016 |
| EP | 0234754 B1 | 11/1990 |
| GB | 1095915 A | 12/1967 |
| GB | 2292613 A | 2/1996 |
| WO | WO-2021110437 A1 * | 6/2021 ............. G01F 1/588 |

OTHER PUBLICATIONS

Translation of WO-2021110437-A1 (Year: 2021).*

* cited by examiner

*Primary Examiner* — Nathaniel T Woodward
(74) *Attorney, Agent, or Firm* — Patrick D. Duplessis

(57) ABSTRACT

A magnetic-inductive flowmeter includes a measuring tube for guiding an electrically conductive medium, a magnetic field device, a magnetic field guiding device, and a control and evaluation unit. The magnetic field device includes at least three coils for generating a magnetic field through the measuring tube. The magnetic field guiding device guides the magnetic field with at least three measuring electrodes for tapping a measurement voltage induced in the medium. The control and evaluation unit generates the magnetic field by energizing the coils and evaluates the measurement voltage. The coils are distributed over a circumference of the magnetic field guiding device, which acts a coil core in a region of the coils, so that the coils are arranged with their coil longitudinal axes in the circumferential direction with respect to the measuring tube. Each of the measuring electrodes is arranged between two coils in the radial direction.

25 Claims, 4 Drawing Sheets

MAGNETIC-INDUCTIVE FLOWMETER

TECHNICAL FIELD

The invention relates to a magnetic-inductive flowmeter, having a measuring tube for conducting an electrically conductive medium, having a magnetic field device comprising a plurality of coils for generating a magnetic field which passes through the measuring tube at least partially perpendicular to the direction of flow of the medium, and having a magnetic field guide device for guiding the magnetic field in regions outside the measuring tube, with measuring electrodes for tapping at least one measurement voltage induced in the medium, and with a control and evaluation unit for generating the magnetic field by energizing at least one of the coils and for evaluating the measurement voltage.

BACKGROUND

A large number of magnetic-inductive flowmeters are known from the prior art. Magnetic-inductive flowmeters necessarily have at least one measuring tube for guiding an electrically conductive medium whose flow is to be determined, and a magnetic field device having one or more coils for generating a magnetic field which passes through the measuring tube at least partially perpendicularly to the direction of flow of the medium. In addition, magnetic-inductive flowmeters known from the prior art also have a magnetic field guide device for guiding the magnetic field in sections outside the measuring tube, as well as measuring electrodes for tapping a measurement voltage induced in the medium.

The measuring principle underlying magnetic-inductive flow measurement is based on the separation of moving charges in an external magnetic field. Due to the charge separation, a measurement voltage is induced in the medium, which can be tapped and evaluated with the aid of measuring electrodes. The evaluation of the measurement voltage results in information about the flow velocity of the medium—averaged over the cross-section of the measuring tube—and thus in information about the volume flow through the measuring tube.

Although the principle of magnetic-inductive flow measurement has proven to be a reliable measuring principle in the state of the art, it is known that magnetic-inductive flowmeters are sensitive to the flow profile of the medium flowing through the measuring tube or to a change in the flow profile, respectively, that the measuring accuracy with which a magnetic-inductive flowmeter can conduct measurements depends on disturbances and asymmetries in the flow profile.

For the description of the field-theoretical relationships between point-wise tapped measurement voltages, the magnetic field distribution in the relevant volume of the measuring tube, the velocity distribution of the medium (flow profile) and the resulting induced electric field distribution, systematic considerations have been made by Shercliff (and also others), from which the concept of the so-called weight-function has arisen. For the physical description of the processes in a magnetic-inductive flowmeter, the electrode voltage is calculated by a volume integral over the interior of the magnetic-inductive flowmeter, the integrand is the scalar product of said weight-function and the velocity field of the flow. Thus, the position-dependent weight function describes the extent to which different flow elements in the volume of the magnetic-inductive flowmeter contribute to the measurement voltage. The more spatially variable the weight function, the more sensitive the flow measurement is to a change in the flow profile. The description of the relationships quickly becomes complex and can only be solved in a closed-loop manner for idealized assumptions regarding the measuring tube geometries, the arrangement of measuring electrodes and the magnetic field distribution. In any case, the weight function approach makes it clear that velocity components distributed over the flow cross-section or the flow volume make different contributions to the induced measurement voltage, so that different velocity profiles can lead to different measurement voltages for the same averaged volumetric flow rate.

Magnetic-inductive flowmeters are often installed in process systems where the medium is guided in a pipe system. Here, for example, different types of pipe systems, such as tees or curved pipes, or changing cross-sections of pipe segments can have an influence on the flow profile in the magnetic-inductive flowmeter and thus on the accuracy of the flow measurement. In the state of the art, therefore, care is taken to ensure that the flow profile in the flowmeter is as undisturbed and symmetrical as possible, which requires defined long inlet and outlet sections, the use of flow straighteners, etc.

SUMMARY

Accordingly, the object of the invention is to provide a magnetic-inductive flowmeter which has a reduced sensitivity to the flow profile, in particular to changes in the flow profile of the medium to be measured.

According to the invention, the object is achieved by the disclosed magnetic-inductive flowmeter, namely in that the magnetic field guiding device is extended closed in the circumferential direction around the measuring tube, that the coils are arranged distributed over the circumference of the magnetic field guiding device and the magnetic field guiding device acts as a coil core in the region of the coils, such that the coils are likewise arranged with their coil longitudinal axes in the circumferential direction with respect to the measuring tube, and that at least three coils and at least three measuring electrodes are provided, and wherein each of the measuring electrodes is arranged between two coils as viewed in the radial direction from the center of the measuring tube.

Various advantages are associated with the structural design of the magnetic-inductive flowmeter. Since the coils are arranged with their longitudinal axes in the circumferential direction to the measuring tube, the position of the coils does not constructively define the entry area of the magnetic field into the measuring tube. This is in contrast to the usual designs, in which the coils are usually oriented with their longitudinal axis radial to the measuring tube—and not in the circumferential direction to the measuring tube—which is why, in these cases, the positions of the coils constructively define the entry point of the magnetic field they generate into the measuring tube. The longitudinal axis of a coil is thus understood here as the direction in which the coil generates a magnetic field when supplied with current. By arranging the coils around the circumference of the magnetic field guide device, it is possible to determine where the magnetic field generated by the coils enters and exits the measuring tube simply by selectively energizing the coils, so that by selectively energizing the coils by the control and evaluation unit, the magnetic field is fundamentally variable in its direction. This does not mean a simple reversal of the polarity of the magnetic field, i.e. a rotation of the magnetic field by 180°, but a change in direction of the magnetic field beyond simple antiparallelism. The described arrangement of the coils around the magnetic field guiding device extending in the circumferential direction of the measuring tube also enables particularly space-saving designs, since no additional space has to be provided in the direction towards the measuring tube, i.e. in the radial direction towards the measuring tube, as is usual in the prior art.

If it is stated that the coils are arranged with their longitudinal coil axes in circumferential direction to the measuring tube, then this can be both straight coils, whose straight center line thus runs practically tangential to the magnetic field guiding device, but this can also be arc-shaped coils, which follow a possible arc-shaped course of the magnetic field guiding device, whose center line is thus also arc-shaped and follows the magnetic field guiding device in its arc-shaped course.

At least three coils ensure that a described change of direction of the magnetic field—and not only a simple reversal of direction—can be implemented.

By using at least three measuring electrodes arranged between two coils, it is constructively ensured that several measuring paths can be implemented, the course of which also have different directions in the cross-section of the measuring tube—and do not just represent a 180° reversal of direction.

The magnetic-inductive flowmeter described here thus makes it possible by design to apply differently oriented magnetic fields to the medium in the measuring tube and to collect different measurement voltages from differently oriented measuring paths, so that considerably better averaging can be achieved even over asymmetrical flow profiles, thereby considerably reducing the sensitivity of the magnetic-inductive flowmeter to varying flow profiles.

Since each of the measuring electrodes is arranged between two coils as viewed from the center in the radial direction from the center of the measuring tube, electrical contact between the measuring electrodes and coils distributed around the circumference of the magnetic field guide device do not interfere with each other in terms of space. When it is stated that each of the measuring electrodes is arranged between two coils as seen in the radial direction from the center of the measuring tube, this does not mean, of course, that a measuring electrode must be arranged between two coils, it merely means that the existing measuring electrodes are arranged between two coils in any case, i.e., as seen from the center of the measuring tube, they are not in alignment with one of the coils which are arranged distributed over the circumference of the magnetic field guiding device.

An advantageous design of the magnetic-inductive flowmeter is characterized by the magnetic field guide device forming an arc-shaped curved ring.

Particularly preferably, the ring is circular or elliptical in shape, at least in certain areas. In another variation, the magnetic field guiding device forms a polygonal ring. The polygonal ring further preferably forms a hexagonal or octagonal polygon. In particular, the polygon preferably has alternating long and short legs. In a particularly preferred variation, the coils are arranged on the long legs.

A further advantageous design of the magnetic-inductive flowmeter is characterized in that the control and evaluation unit supplies current to at least some of the coils in at least a first operating mode in such a way that the generated magnetic field in the region of the measuring tube is aligned in a first operating direction, and that the control and evaluation unit supplies current to at least some of the coils in at least a second operating mode in such a way that the generated magnetic field in the region of the measuring tube is aligned in a second operating direction different from the first operating direction. Again, in a "different direction" it is to be understood that not the trivial case of antiparallelism is meant, but the generated magnetic fields are inclined with respect to each other in an angle different from 0° and 180°. In addition, only one magnetic field reversal can be implemented, this is not excluded, in any case, a change of direction in the sense described here must also additionally be implemented.

The design according to the invention makes it possible, due to the energization of at least a part of the coils, to generate magnetic fields in at least two different operating directions. For each operating direction, the magnetic field may have two orientations, namely a first orientation and an opposite second orientation, namely rotated by 180° with respect to the first orientation. The different operating directions may be generated in different ways, for example by energizing different subsets of the coils, wherein the subsets do not have common coils; however, in other implementations, the subsets may have some common coils. However, the same coils may also be supplied current, for example in different directions and/or strengths.

A further advantageous design of the magnetic-inductive flowmeter is characterized in that the control and evaluation unit for generating the magnetic field supplies current to a plurality of the coils in each case at least in the first operating direction and the second operating direction.

In a preferred embodiment of the magnetic-inductive flowmeter, the control and evaluation unit implements a change in the current flowing through the coils as stepwise as possible, whereby, for example, transitions between different operating modes can be realized quickly and also in any sequence. In order to realize such step-like or rectangular current characteristics, relatively large voltages must be used at times, since the effective current-voltage area is known to be decisive for the change in current in coils. In an alternative embodiment, the control and evaluation unit ensures that a change in the current flowing through the coils is realized sinusoidally; it is particularly advantageous if sinusoidal current waveforms are realized continuously. The special feature here is that no voltage peaks occur in particular with a continuously sinusoidal current waveform, but the current state of the coils involved is of course fixed in time, so that the operating modes that can be implemented are also limited in their design.

Advantageously, the control and evaluation unit energizes the coils in such a way that the overall realized magnetic circuit, in particular the magnetic field device and the magnetic field guiding device, operates in a linear range, in particular avoiding the range of magnetic saturation. Under this condition, the measuring system as a whole can be regarded as operating linearly, so that without further consideration, for example, the linear superposition of physical effects can be assumed.

A further advantageous design of the magnetic-inductive flowmeter is characterized in that the measuring electrodes are arranged between two coils as seen in the radial direction from the center of the measuring tube in such a way that at least a first pair of the measuring electrodes forms a first measuring section with a first measuring section direction. Here, the first measuring section direction and the first operating direction of the magnetic field are inclined with respect to each other, preferably they are inclined more than 45° with respect to each other, most preferably they are inclined 90° with respect to each other. Furthermore, the described advantageous design is characterized in that at least a second pair of the measuring electrodes forms a second measuring section with a second measuring section direction, wherein the second measuring section direction and the second operating direction of the magnetic field are also inclined with respect to each other, preferably more than 45° inclined with respect to each other, very preferably 90° inclined with respect to each other. The further the measuring section direction is inclined relative to the operating direction of the magnetic field, the more effectively the charge separation in the measuring section direction and thus the better the induced electrical measurement voltage can be detected based on measurement.

It is common to all embodiments that the various captured measurement voltages are used by the control and evaluation unit to determine a volumetric flow rate through the measuring tube therefrom. The variety of operating directions of the magnetic field and the variety of differently oriented measurement voltages makes it possible to obtain flow information that is clearly independent of the flow profile.

A further advantageous design of the magnetic-inductive flowmeter is characterized in that the control and evaluation unit for determining an improved flow measurement value in a measurement sequence performs the first operating mode at least once and determines a first measurement voltage and/or a first flow measurement value in the first operating mode using the first pair of measurement electrodes and, at least once, performs the second operating mode and in the second operating mode determines a second measurement voltage and/or a second flow measurement value with the second pair of measuring electrodes and determines the improved flow measurement value from the first measurement voltage and the second measurement voltage and/or from the first flow measurement value and the second flow measurement value. Particularly preferably, the improved flow measurement value is formed by the control and evaluation unit by averaging the first measurement voltage and the second measurement voltage and/or by averaging the first flow measurement value and the second flow measurement value.

A further advantageous design of the magnetic-inductive flowmeter is characterized in that the control and evaluation unit performs the first operating mode at least twice in the measuring sequence, so that the magnetic field is generated in one orientation of the first operating direction of the magnetic field and in the other orientation of the first operating direction of the magnetic field (i.e., they are opposite orientations) and corresponding sub measurement voltages/sub flow measurement values are captured at each orientation of the first operating direction of the magnetic field with the first pair of measurement electrodes, and the first flow measurement value is calculated from the sub measurement voltages/sub flow measurement values and that the control and evaluation unit performs the second operation mode at least twice in the measuring sequence so that the magnetic field is generated in one orientation of the second operation direction of the magnetic field and in the other orientation of the second operation direction of the magnetic field (again, these are opposite orientations) and corresponding sub measurement voltages/sub flow measurement values are captured at each orientation of the second operation direction of the magnetic field with the second pair of the measurement electrodes and the second flow measurement value is calculated from the sub measurement voltages/sub flow measurement values. These are measures to eliminate electrochemical potentials at the measuring electrodes that do not change with the orientation of the magnetic field.

A further advantageous design of the magnetic-inductive flowmeter is characterized in that the control and evaluation unit performs the measuring sequence at least at times in such a way that initially the magnetic field is generated successively in the two orientations of the first operating direction or the second operating direction and then successively the magnetic field is generated in the two orientations of the second operating direction or the first operating direction, in particular wherein the orientations of the operating directions are also driven alternately several times in succession.

A further advantageous design of the magnetic-inductive flowmeter is characterized in that the control and evaluation unit performs the measuring sequence at least temporarily in such a way that the orientations of at least two operating directions of the magnetic field are controlled successively in such a way that, viewed in the axial direction of the measuring tube, a step-wise rotating magnetic field results. Depending on the specific design of the coil arrangement, an advantage of this mode of operation may be that when the operating direction is changed, coils previously supplied with current can simply decay in their excitation, while other coils must be transferred from an unenergized state to an energized state, so that the time period for reaching a steady state of energization is reached more quickly than if previously energized coils must be supplied with current in the opposite direction.

A preferred design of the magnetic-inductive flowmeter is characterized in that the control and evaluation unit supplies current to at least some of the coils in at least one intermediate operating mode in such a way that the generated magnetic field in the region of the measuring tube is aligned in an intermediate operating direction, wherein the intermediate operating direction is aligned differently from the first operating direction and the second operating direction and optionally further operating directions, in particular wherein fewer coils are supplied current in order to generate the magnetic field in the intermediate operating direction than are supplied current in order to generate the magnetic field in the operating directions. The measure of generating intermediate operating directions takes into account the idea of magnetically exciting the medium in the measuring tube under several operating directions in order to be able to derive volume flow information that is as close to average as possible and independent of the flow profile.

A further advantageous design of the magnetic-inductive flowmeter is characterized in that the control and evaluation unit supplies current to at least some of the coils in at least one intermediate operating mode with currents of different magnitudes, so that the magnetic field generated in the region of the measuring tube is aligned in an intermediate operating direction, wherein the intermediate operating direction is aligned differently from the first operating direction and the second operating direction and possibly further operating directions. This measure makes use of the special design feature of the magnetic-inductive flowmeter that the coils are arranged with their longitudinal axis (=direction of the magnetic field generated by the coils) in the circumferential direction of the measuring tube, and without the entry points of the magnetic field into the interior of the measuring tube being determined by design (for example by the otherwise usual design of pole shoes), the entry point of the magnetic field from the magnetic field guide device into the interior of the measuring tube is determined by the energization of the coils. This makes it possible to influence and determine the direction of the magnetic field in the measuring tube by selecting different currents for the coils.

In a preferred variation, fewer coils are supplied current in order to generate the magnetic field in the intermediate operating direction than are supplied current in order to generate the magnetic field in the operating directions.

A further advantageous design of the magnetic-inductive flowmeter is characterized in that the control and evaluation unit for determining an improved flow measurement value in a measuring sequence determines at least one intermediate measurement voltage/flow measurement value in addition to the measurement voltages/flow measurement values from the least first operating mode and the least second operating mode with a pair of measurement electrodes in the intermediate operating mode and determines from the first measurement voltage/the first flow measurement value the second measurement voltage/the second flow measurement value and the intermediate measurement voltage/the intermediate flow measurement value to determine the improved flow measurement value. The use of flow values is recognizably equivalent to the use of the (intermediate) measurement voltages captured by the pairs of measurement electrodes.

In particular, the improved flow measurement value is formed by averaging the first measurement voltage/first flow measurement value, the second measurement voltage/second flow measurement value, and the intermediate measurement voltage/flow measurement value.

Another advantageous design of the magnetic-inductive flowmeter is characterized in that exactly three measuring electrodes are provided. The three measuring electrodes are arranged at angles of between 90° and 150° to each other, as seen from the center of the measuring tube. Here it is preferred, but not necessary, that the electrodes are arranged symmetrically at an angle of 120° to each other. In addition, exactly three coils are arranged at angles between 90° and 150° to each other. Here it is also preferred, but not necessary, that the three coils are arranged symmetrically at an angle of 120° to each other and are arranged at an angle of 40° to 80°, in particular at an angle of 60°, to the measuring electrodes. To generate the magnetic field in three operating directions, two of the coils are supplied with current by the control and evaluation unit for each operating direction.

Another advantageous design of the magnetic-inductive flowmeter is characterized in that exactly three measuring electrodes are provided and that the three measuring electrodes are arranged at angles between 90° and 150° to each other, as seen from the center of the measuring tube. Particularly preferably, the exactly three measuring electrodes are arranged symmetrically at an angle of 120° to each other. Furthermore, six coils are provided. Two of the six coils each have a measuring electrode between them, as seen from the center of the measuring tube, and two measuring electrodes each have two coils between them. Preferably, three of the six coils are each arranged at an angle of 120° to one another and the two coils adjacent to a measuring electrode are each arranged at the same angle to the measuring electrode.

A further advantageous design of the magnetic-inductive flowmeter is characterized in that, in order to generate the magnetic field in an operating direction, at least four coils are supplied with current by the control and evaluation unit, preferably coils which are symmetrical to the axis of the operating direction.

A further advantageous design of the magnetic-inductive flowmeter is characterized in that three measuring paths are implemented with the three measuring electrodes, that the control and evaluation unit generates three magnetic fields with different operating directions in three operating modes and performs all three operating modes in the measuring sequence and obtains three measurement voltages/three flow measurement values from the three measuring paths and obtains an improved flow measurement value from the three measurement voltages/three flow measurement values.

A further advantageous design of the magnetic-inductive flowmeter is characterized in that exactly four measuring electrodes are provided, in that the four measuring electrodes are arranged at angles of between 70° and 110° to one another, as seen from the center of the measuring tube, in particular symmetrically at an angle of 90° to one another, and that exactly four coils are arranged at an angle of between 70° and 110° to one another, in particular symmetrically arranged at an angle of 90° to one another, and are arranged at an angle of 35° to 55°, in particular at an angle of 45° to the measuring electrodes, in particular wherein, in order to generate the magnetic field in two operating directions for each operating direction, in each case all four coils are supplied with current by the control and evaluation unit.

A further advantageous design of the magnetic-inductive flowmeter is characterized in that exactly four measuring electrodes are provided, that the four measuring electrodes, viewed from the center of the measuring tube, are arranged at angles between 70° and 110° to one another, in particular symmetrically arranged at an angle of 90° to one another, and that eight coils are provided, in particular wherein in each case two of the eight coils, viewed from the center of the measuring tube, have a measuring electrode between them and two measuring electrodes each have two coils between them, and in that preferably in each case four of the eight coils are in each case arranged at an angle of 90° to one another and in each case the two coils arranged adjacent to a measuring electrode are arranged at the same angle to the measuring electrode.

A further advantageous design of the magnetic-inductive flowmeter is characterized in that at least four coils are supplied with current by the control and evaluation unit to generate the magnetic field in an operating direction, preferably coils that are symmetrical to the axis of the operating direction.

A further advantageous design of the magnetic-inductive flowmeter is characterized in that, in order to generate the magnetic field in an operating direction, exactly four coils are supplied with current by the control and evaluation unit, in particular the four coils which lie symmetrically to the axis of the operating direction and are spaced furthest from the axis of the operating direction.

It has been described before that the control and evaluation unit calculates the volumetric flow of the medium, for example, by averaging captured measurement voltages/volumetric flows from the different measurements in different operating modes. More generally, according to a preferred further development, it is provided that the control and evaluation unit calculates the volumetric flow of the medium from a linear combination of several of the captured measurement voltages/calculated volumetric flows, in particular wherein the measurement voltages/volumetric flows are weighted by weighting factors. For this purpose, calibration measurements can be performed with varying, but known volumetric flow rates. In order to determine the most appropriate choice of linear correlation and/or weighting factors, the weighting factors and correlations can be determined using optimization methods.

According to another preferred further development of the magnetic-inductive flowmeter, the control and evaluation unit calculates the volumetric flow rate of the medium with a non-linear function in several of the captured measurement voltages/calculated volumetric flow rates from the different operating modes.

In a preferred further development of the magnetic-inductive flowmeter, the nonlinear function is formed by an artificial neural network having an input layer with at least a number of input neurons corresponding to the number of detected measurement voltages/calculated volume flows as input variables, having an output layer with at least one output neuron for outputting at least the volume flow of the medium as output variable, and having at least one intermediate layer with at least two neurons, in particular wherein the artificial neural network is calibrated with calibration data. The calibration data can originate from real calibration measurements, but they can also originate from corresponding numerical simulations, if these are available.

BRIEF DESCRIPTION OF THE DRAWINGS

In detail, there are a multitude of possibilities for designing and further developing the magnetic-inductive flowmeter according to the invention. In this regard, reference is made to the description of preferred embodiments in connection with the drawings.

DETAILED DESCRIPTION

The figures schematically show various aspects of magnetic-inductive flowmeters 1 considered herein, some of which are design aspects and some of which are aspects of operation of the magnetic-inductive flowmeters 1.

Figure 1:
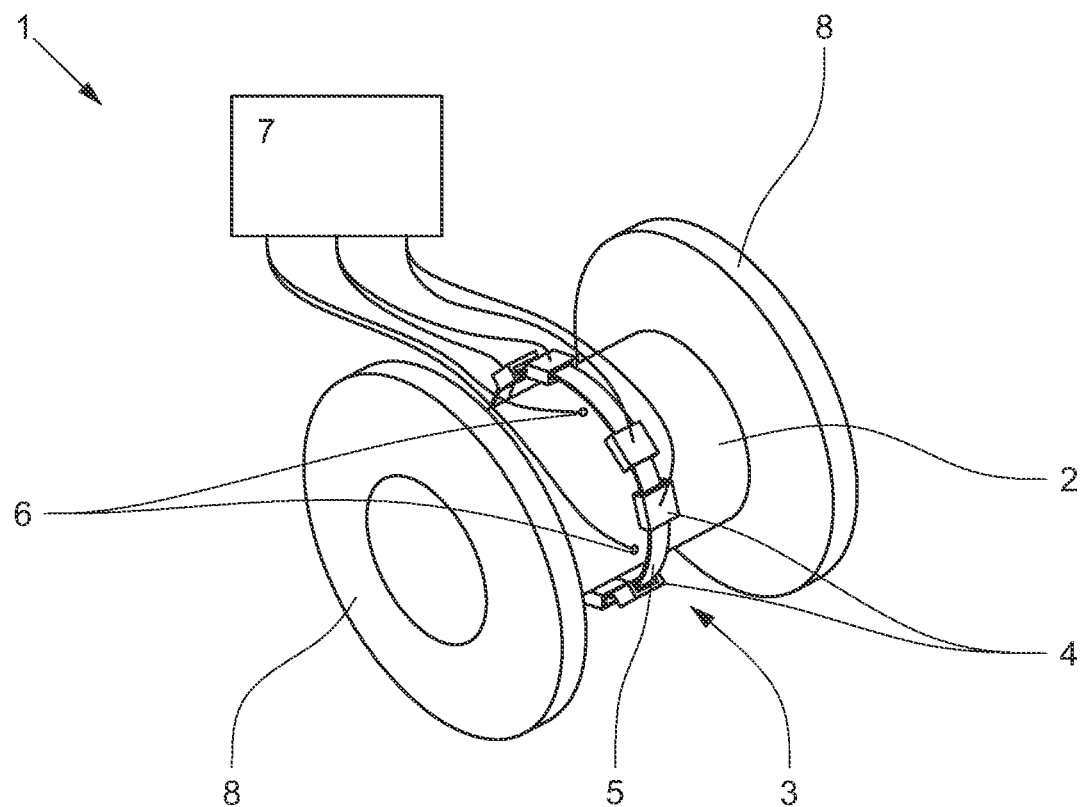
FIG. 1 schematically illustrates a magnetic-inductive flowmeter with a measuring tube, a magnetic field device with coils, with a magnetic field guide device, with measuring electrodes and with a control and evaluation unit.

FIG. 1 shows a magnetic-inductive flowmeter 1 with a measuring tube 2 for guiding an electrically conductive medium, with a magnetic field device 3, comprising a plurality of coils 4 for generating a magnetic field B passing through the measuring tube 2 at least partially perpendicular to the direction of flow of the medium, and a magnetic field guide device 5 for guiding the magnetic field B in regions outside the measuring tube 2, having measuring electrodes 6 for tapping at least one measurement voltage U induced in the medium, and having a control and evaluation unit 7 for generating the magnetic field B by energizing at least one of the coils 4 and for evaluating the measurement voltage U. The magnetic-inductive flowmeter 1 has flanges 8 at the ends of the measuring tube 2, by means of which it can be installed in the pipe system of a process involving fluids whose flow it is to determine.

In the prior art, magnetic-inductive flowmeters—not shown here—are in common use, which differ from the design shown in FIG. 1 (and also in the other figures). Frequently, the magnetic field device implemented in the prior art consists of two coils which are opposite each other at the circumference of the measuring tube and are arranged so that their axes point radially to the center of the measuring tube. The coils are then supplied identically with current. Pole shoes are often implemented, which structurally define the points at which the magnetic field generated by the radially aligned coils enters and also exits the interior of the measuring tube. In most cases, two measuring electrodes are implemented which detect the measurement voltage induced in the flowing medium, which is essentially proportional to the flow velocity of the medium in the measuring tube averaged over the cross-section of the measuring tube.

In contrast, the magnetic-inductive flowmeters 1 shown here are characterized in that the magnetic field guiding device 5 is extended closed in the circumferential direction around the measuring tube 2, wherein the coils 4 are arranged distributed over the circumference of the magnetic field guiding device 5 and the magnetic field guiding device 5 acts as a coil core in the region of the coils 4, so that the coils 4 are likewise arranged with their coil longitudinal axes in the circumferential direction with respect to the measuring tube 2. At least three coils 4 and at least three measuring electrodes 6 are provided, wherein each of the measuring electrodes 6 is arranged between two coils 4 as seen in the radial direction from the center of the measuring tube 3.

The magnetic-inductive flowmeters 1 shown in the figures have the feature that the positions of the coils 4 do not strictly define the entry region of the magnetic field B into the measuring tube 2 by design, since the coils 4 are arranged with their longitudinal coil axes in the circumferential direction with respect to the measuring tube 2. By arranging the coils 4 around the circumference of the magnetic field guide device 5, it is possible to determine where the magnetic field B generated by the coils 4 enters and exits the measuring tube 2 by selectively energizing the coils 4, so that the direction of the magnetic field B is basically variable by selectively energizing the coils 4 by the control and evaluation unit 7. This is based on the understanding that the entry and exit points of the magnetic field B are not punctual locations on the circumference of the magnetic field guiding device 5, but regions with a certain extent. With this understanding, these regions can be varied and adjusted by energizing the coils 4. In any case, this makes it clear that, in any case, the positions of the coils 4 themselves are not the decisive entry points of the magnetic field B into the measuring tube 2, nor are they the decisive exit points of the magnetic field B from the measuring tube 2. As already explained in the general description part, the change of direction of the magnetic field B does not mean a simple reversal of the polarity of the magnetic field B, but a change of direction of the magnetic field B beyond the antiparallelism. The described arrangement of the coils 4 around the magnetic field guiding device 5 extending in the circumferential direction of the measuring tube also allows space-saving designs, since no additional space is required in the direction of the measuring tube 2 (see FIG. 1).

By means of at least three coils 4 it is ensured that a described change of direction of the magnetic field B—and not only a simple reversal of direction—can be implemented. By at least three measuring electrodes 6 it is again ensured that more than one measuring distance can be implemented through the cross-section of the measuring tube 2. The specified design specifications thus fundamentally enable variable excitation of the medium over the cross-section of the measuring tube 2 and also variable geometric implementation of measuring sections over the cross-section of the measuring tube 2, whereby a variety of flow information collected under different geometric boundary conditions can be captured over the cross-section of the measuring tube 2, through whose calculation in the flow measurement a remarkable independence from variable flow profiles can be achieved.

In the embodiment according to FIG. 1, the magnetic field guiding device 5 forms an arc-shaped curved ring that is essentially circular in shape. The geometry is relatively easy to implement and, due to its principle, does not exhibit any spatial dependencies owed to the shape, in particular not with regard to the entry and exit points of the magnetic field B into and out of the measuring tube 2, which can be influenced by energizing the coils.

Figure 2:
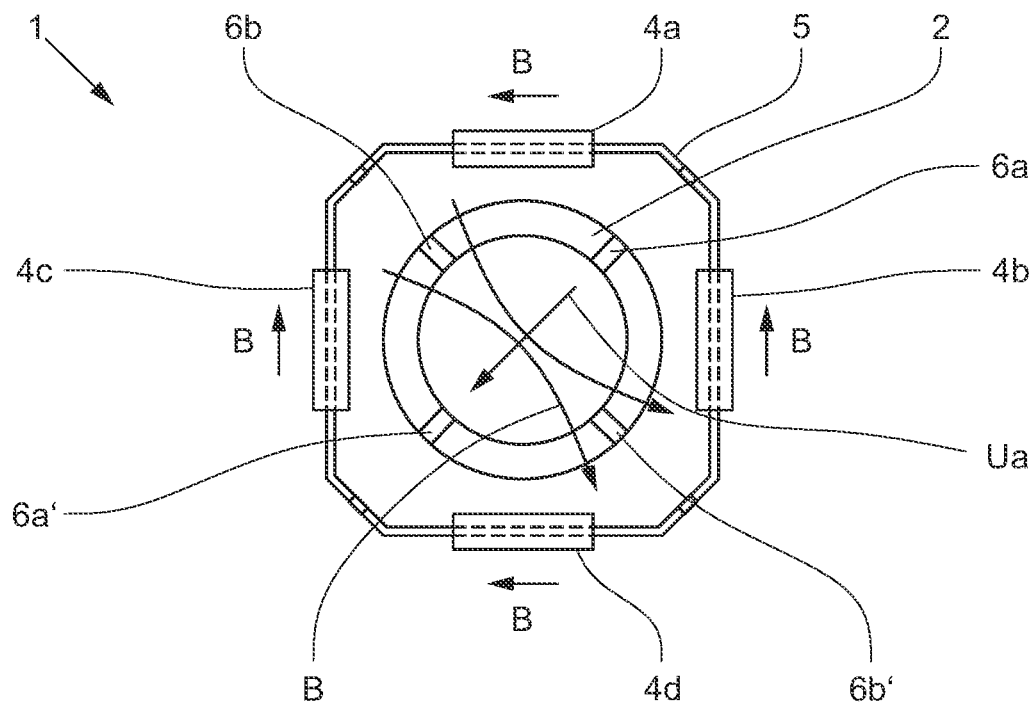
FIG. 2 schematically illustrates a magnetic-inductive flowmeter in a sectional view in the area of the magnetic field device and recognizable positions of coils and measuring electrodes.

A further design of a magnetic-inductive flowmeter 1 is shown schematically in FIG. 2, wherein here, on the basis of a cross-section through the region of the magnetic field device 3 and the magnetic field guide device 5 including the coils 4 applied thereto, the relationships are more easily recognizable with respect to the arrangement of the coils 4 and the measuring electrodes 6. FIG. 2 also shows, in principle, how the design can be used to implement spatially varying coverage of the excitation of the medium by magnetic fields B which can, in principle, be set with variable direction—assuming a correspondingly varying current supply to the coils 4—and also to implement measuring paths with variable direction.

In the embodiment according to FIG. 2, the magnetic field guide device 5 forms a polygonal, here octagonal, ring. The polygonal ring has alternating long and short legs, wherein the coils 4 are arranged on the long legs.

In the embodiment according to FIG. 2, the coils 4a, 4b are supplied with current to generate a magnetic field B in one orientational direction with respect to the magnetic field guiding device 5, and the coils 4c, 4d are supplied with current to generate a magnetic field B in the opposite passing direction with respect to the magnetic field guiding device 5. The total magnetic field B enters the free space and the measuring tube 2 between the coils 4a and 4c, passes through the measuring tube 2 and re-enters the magnetic field guiding device 5 between the coils 4b, 4d. The reference B is not to be understood here as an arithmetic formula symbol.

A total of 4 measuring electrodes 6a, 6a', 6b, 6b' are provided in the wall of the measuring tube 2. Various measurement voltages U can be captured between the measuring electrodes 6. In the embodiment shown, a measurement voltage Ua is captured between the measuring electrodes 6a and 6a'. For clarity, FIG. 2 does not show that the coils 4 are partially supplied with current in a different operating mode from the operating mode shown. In this mode of operation, which is not shown, the direction of feeding the coils 4b, 4c with current is reversed, so that the direction of the magnetic field generated by the coils 4b, 4c also reverses its direction with respect to the magnetic field guiding device 5. Clearly, this causes the resulting magnetic field B to enter the free space and the measuring tube 2 between the coils 4c, 4d, pass through the measuring tube 2, and re-enter the magnetic field guiding device 5 between the coils 4a, 4b. Of course, it is possible that the free space magnetic field exits directly from the coils 4 in the peripheral region and also enters the coils 4 directly in the peripheral region. However, these are stray fields, and the significant portion of the magnetic field B behaves as described. The direction of the magnetic field B can be varied in other ways, for example by varying the current intensity in the coils 4. The orientations of the respective measuring distances between the measuring electrodes 6, between which a measurement voltage U is captured, are not variable; they are fixed by the fixed installation position of the measuring electrodes 6. In all embodiments, the measuring electrodes 6 are arranged between two coils 4 in the radial direction as viewed from the center of the measuring tube 2. In addition to the advantage that the measuring electrodes 6 are thus more easily accessible (mounting, electrical contacting), this also has the further constructive advantage that the measuring paths that can be implemented with the measuring electrodes 6 are, for the most part, inclined to the course of magnetic fields B that can be generated and thus at least partially run in the direction of the course of an electrical potential change (induced electrical voltage).

In FIGS. 3 to 6, various operating modes are shown which are essentially concerned with how the coils 4 are supplied with current in order to generate certain magnetic field directions. The operating modes are also transferable correspondingly to the magnetic-inductive flowmeters 1 which are shown schematically in FIGS. 7 and 8. The illustrations in FIGS. 3 to 6 refer here to the magnetic-inductive flowmeter 1 shown in FIG. 2 with four coils 4a, 4b, 4c, 4d and with four measuring electrodes 6a, 6a', 6b, 6b'.

What is common to all the magnetic-inductive flowmeters 1 shown is that the control and evaluation unit 7 supplies current to at least some of the coils 4 in at least a first operating mode M1 in such a way that the generated magnetic field B in the region of the measuring tube 2 is aligned in a first operating direction, and that the control and evaluation unit 7 supplies current to at least some of the coils 4 in at least a second operating mode M2 in such a way that the generated magnetic field B in the region of the measuring tube 2 is aligned in a second operating direction different from the first operating direction. It should be noted here again that a direction is to be understood mathematically, i.e. defined by a straight line which has two orientations, a first orientation and the orientation antiparallel thereto. An orientation reversal is therefore not a change of direction.

In the embodiments shown in FIGS. 3 to 6, there are two modes of operation M1 and M2 in any case, which, in connection with the constructive design of the magnetic-inductive flowmeter 1 according to FIG. 2, result in a magnetic field B being generated in the two different modes of operation M1 and M2 in magnetic field directions that are perpendicular to one another. In each case, current flow diagrams 9 are also shown, which document the energization of the four coils involved 4a, 4b, 4c, 4d with a current I over time. Above the current flow diagrams 9, the resulting magnetic field directions of the magnetic field B are indicated in each case, which is easily understood in connection with the illustrations of the magnetic field devices 3 with the coils 4a, 4b, 4c, 4d. In the current diagrams 9 the operating modes M1, M2 are drawn in each case.

In the representations of the magnetic field devices 3 with the measuring tube 2, the coils 4 and the magnetic field guide device 5, the measuring electrodes 6a, 6a' or 6b, 6b' involved in the measurement of the induced measurement voltage U in the respective operating mode M1, M2 are also indicated in each case.

The electromagnetic flowmeters shown in FIGS. 3 to 6 also have in common that the measuring electrodes 6 are arranged between two coils 4 in the radial direction as seen from the center of the measuring tube 2 in such a way that a first pair 6a, 6a' of the measuring electrodes 6 form a first measuring section with a first measuring section direction, wherein the first measuring path direction and the first operating direction of the magnetic field B are inclined to each other, presently 90° to each other, and that a second pair 6b, 6b' of the measuring electrodes 6 form a second measuring path with a second measuring path direction, wherein the second measuring path direction and the second operating direction of the magnetic field B are inclined to each other, presently also 90° to each other.

In the case of the operating mode M1, the measuring electrodes 6a, 6a' capture a measurement voltage U, and in the operating mode M2, the measuring electrodes 6b, 6b' capture the measurement voltage U. In both cases, the measurement voltage U is perpendicular to the direction of the magnetic field B. Thus, a maximum induction effect is obtained.

The magnetic-inductive flowmeters 1 in FIGS. 3 to 6 also have in common that, in order to determine an improved flow measurement value Vp in a measuring sequence MS, the control and evaluation unit 7 performs the first operating mode M1 at least once and determines a first measurement voltage U1 and/or a first flow measurement value Vp1 in the first operating mode M1 with the first pair of measurement electrodes 6, and at least once performs the second operating mode M2 and in the second operating mode M2 determines a second measurement voltage U2 and/or a second flow measurement value Vp2 with the second pair of measuring electrodes 6 and determines the improved flow measurement value Vp from the first measurement voltage U1 and the second measurement voltage U2 and/or from the first flow measurement value Vp1 and the second flow measurement value Vp2, in particular by averaging. In general, then:

$$Vp=f(U1,U2) \text{ or}$$

$$Vp=f(Vp1(U1),Vp2(U2)).$$

Figure 3:
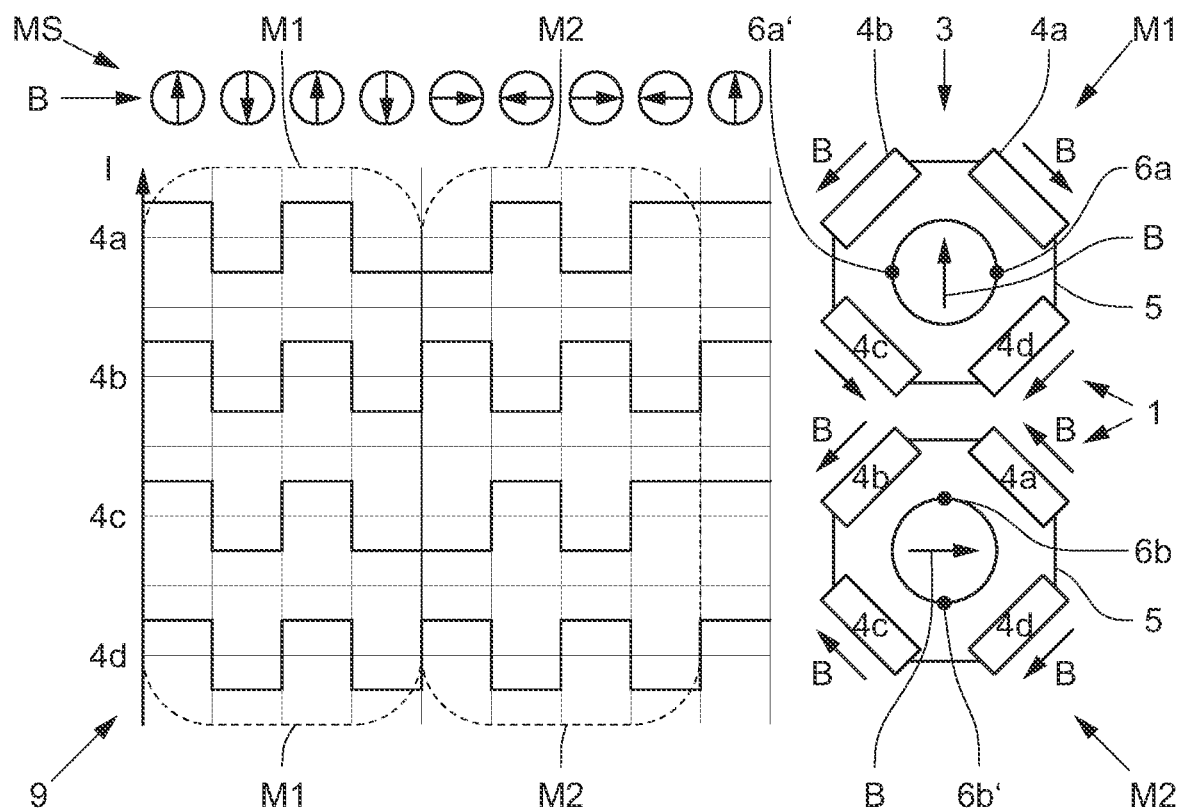
FIG. 3 schematically illustrates an embodiment of operating modes for energizing the coils of a magnetic-inductive flowmeter and a measuring sequence.
Figure 4:
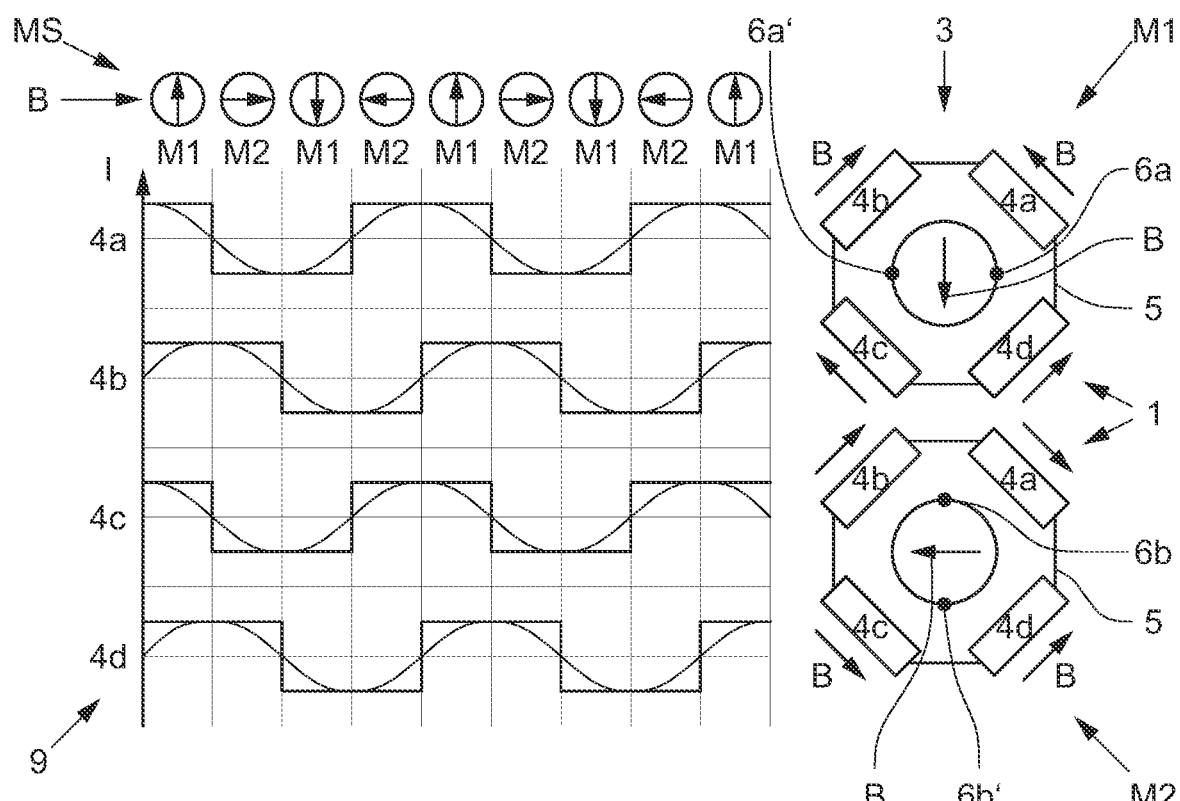
FIG. 4 schematically illustrates a further embodiment of operating modes for energizing the coils of a magnetic-inductive flowmeter and a further measuring sequence.
Figure 5:
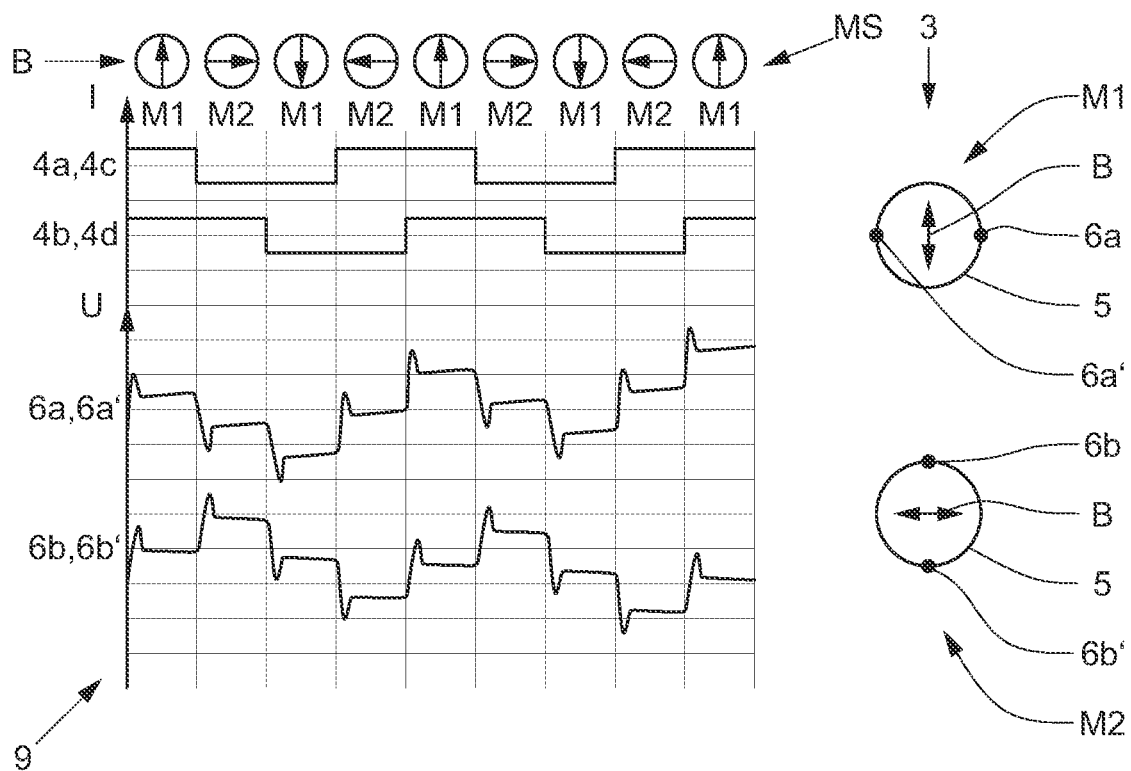
FIG. 5 schematically illustrates another embodiment for operating modes for energizing the coils of a magnetic-inductive flowmeter and a further measuring sequence.

In particular, f is the averaging of the arguments. As shown in FIGS. 3 to 5, multiple measurement voltages are also captured in a measuring sequence MS in each operating mode M1, M2. It is true in the embodiments that the control and evaluation unit 7 performs the first operation mode M1 at least twice (even four times in FIGS. 3 to 5) in the measuring sequence MS, so that the magnetic field B is generated in one orientation of the first operation direction of the magnetic field B and in the other orientation of the first operation direction of the magnetic field B, and corresponding sub measurement voltages Us1.1, Us1.2/sub flow measurement values Vps1.1, Vps1.2 are captured at each orientation of the first operating direction of the magnetic field B with the first pair of the measurement electrodes 6, and the first flow measurement value Vp1 is calculated from the sub measurement voltages Us1.1, Us1.2/sub flow measurement values Ups1.1, Ups1.2, and that the control and evaluation unit 7 performs the second operating mode M2 at least twice in the measuring sequence MS, so that the magnetic field B is generated in one orientation of the second operating direction of the magnetic field B and in the other orientation of the second operating direction of the magnetic field B and corresponding sub measurement voltages Us2.1, Us2.2/sub flow measurement values Vp2.1, Vp2.2 are captured at each orientation of the second operating direction of the magnetic field B with the second pair of the measuring electrodes 6, and the second flow measurement value Vp2 is calculated from the sub measurement voltages Us2.1, Us2.2/sub flow measurement values Vp2.1, Vp2.2. Thus:

$$U1=g(Us1.1,Us1.2), U2=g(Us2.1,Us2.2).$$

$$Vp1=h(Vp1.1,Vp1.2), Vp2=h(Vp2.1,Vp2.2).$$

The use of several measurement voltages Ui in a first direction and in a direction antiparallel to it or in a second direction and in a direction antiparallel to it makes sense insofar as electrochemical disturbance voltages, which are independent of the magnetic field direction, can be averaged out by this method.

In the magnetic-inductive flowmeter 1 according to FIG. 3, it is implemented that the control and evaluation unit 7 performs the measuring sequence MS at least at times in such a way that initially the magnetic field B is successively measured in the two orientations of the first operating direction, i.e. in the operating mode M1 (alternatively: in the second operating direction, i.e. in operating mode M2) and then the magnetic field B is generated successively in the two orientations of the second operating direction, i.e. in operating mode M2 (alternatively: in the first operating direction, i.e. in operating mode MD, wherein the orientations of the operating directions M1, M2 are also driven alternately several times in succession; in the embodiment, in each case, twice in succession.

In the magnetic-inductive flowmeter 1 according to FIG. 4, it is implemented that the control and evaluation unit 7 performs the measuring sequence MS, at least at times, in such a way that the orientations of at least two operating directions of the magnetic field B (and thus the operating modes Mi) are successively controlled in such a way that, viewed in the axial direction of the measuring tube 2, a stepwise rotating magnetic field B results. An interesting aspect of the embodiment is further that the current flow of the coils 4 is shown here in two alternative realizations. On the one hand, it is shown that the control and evaluation unit 7 realizes a change in the current flow to the coils 4 in a stepwise or rectangular manner as far as possible. On the other hand, with the realized sequence of operating modes Mi, it is also possible that the control and evaluation unit 7 realizes the change in the current flow of the coils 4 continuously sinusoidally, which is shown in the same current flow diagram 9.

FIG. 5 not only shows the current diagram 9 with the currents I applied to the coils 4a, 4c and 4b, 4d, but also the time characteristics of the measurement voltages U at the measurement electrode pairs 6a, 6a' and 6b, 6b'. It can be seen from the voltage curves that a linearly increasing electrochemical electrode voltage is superimposed on the induced voltage, wherein it is assumed here that the flow velocity and thus the volumetric flow rate is unchanging in the period shown. This electrode voltage can be eliminated computationally by known measures (for example, by capturing and accounting for sub measurement voltages or sub flow measurement values). It can also be seen that the jump-like change in the current applied to the coils 4 has an effect on both captured measurement voltages Ui. Thus, measured values should not be captured until these transient disturbances have subsided.

Figure 6:
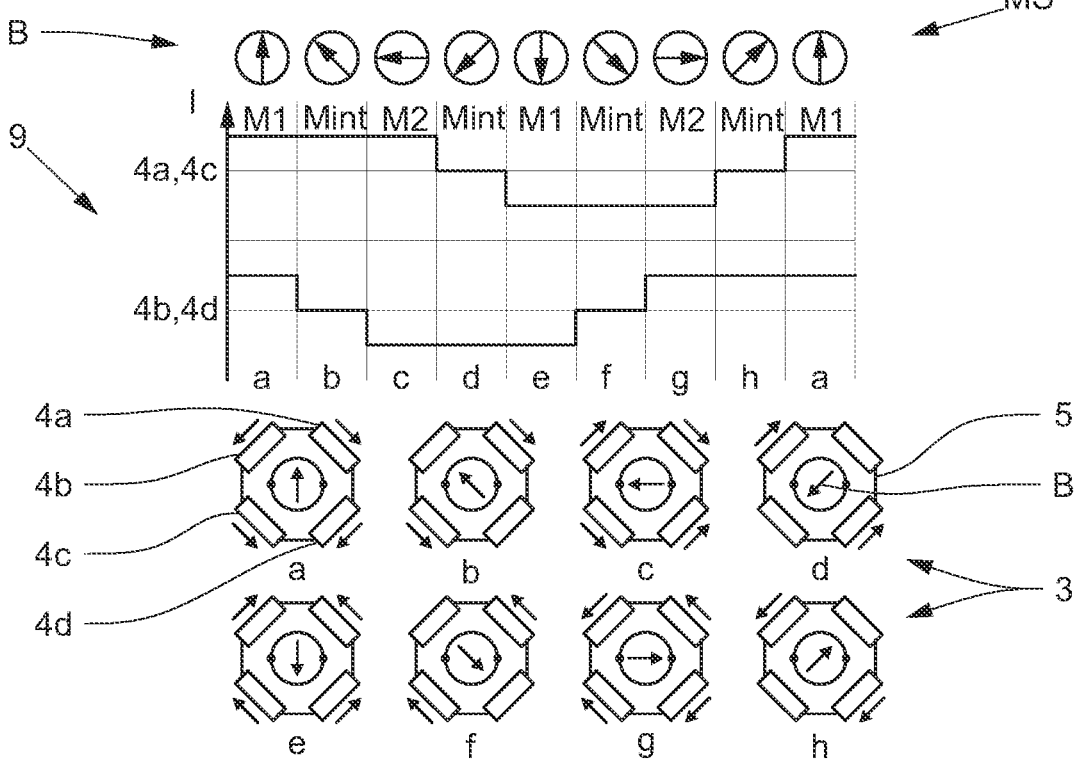
FIG. 6 schematically illustrates an embodiment using intermediate operating modes for energizing the coils of a magnetic-inductive flowmeter.

The magnetic-inductive flowmeter 1 according to FIG. 6 has the special feature that the control and evaluation unit 7 supplies current to a part of the coils 4 in at least one intermediate operating mode Mint in such a way that the generated magnetic field B in the region of the measuring tube 2 is aligned in an intermediate operating direction, wherein the intermediate operating direction is aligned differently from the first operating direction in the first operating mode M1 and the second operating direction in the second operating mode M2 and optionally further operating directions. In the present case, fewer coils 4 are supplied with current to generate the magnetic field B in the intermediate operating direction in the intermediate operating mode Mint than are supplied with current to generate the magnetic field B in the operating directions in the operating modes M1, M2.

In a magnetic-inductive flowmeter 1 not expressly shown here, it is implemented that the control and evaluation unit 7 supplies current to at least some of the coils 4 in at least one intermediate operating mode Mint with currents of different magnitudes, so that the generated magnetic field B in the region of the measuring tube 2 is aligned in an intermediate operating direction, wherein the intermediate operating direction is aligned differently from the first operating direction in the first operating mode M1 and the second operating direction in the second operating mode M2 and optionally from further operating directions, in particular wherein fewer coils 4 are supplied with current to generate the magnetic field B in the intermediate operating direction than are supplied with current to generate the magnetic field B in the operating directions.

The implementation of the intermediate operating mode Mint is useful if, in order to determine an improved flow measurement value Vp in a measuring sequence Ms, the control and evaluation unit 7, in addition to the measurement voltages Ui/flow measurement values Vpi, determines at least one intermediate measurement voltage Uint/an intermediate flow measurement value Vpint from the least first operating mode M1 and the least second operating mode M2 with a pair of measurement electrodes 6 in the intermediate operating mode Mint, and determines the second measurement voltage U2/the second flow measurement value Vp2 and the intermediate measurement voltage Uint/the intermediate flow measurement value Vpint from the first measurement voltage U1/the first flow measurement value Vp1 in order to determine the improved flow measurement value Vp, in particular by averaging. Accordingly:

$$Vp = i(U1, U2, U\text{int})$$

$$Vp = i(Vp1, Vp2, Vp\text{int}).$$

Figure 7:
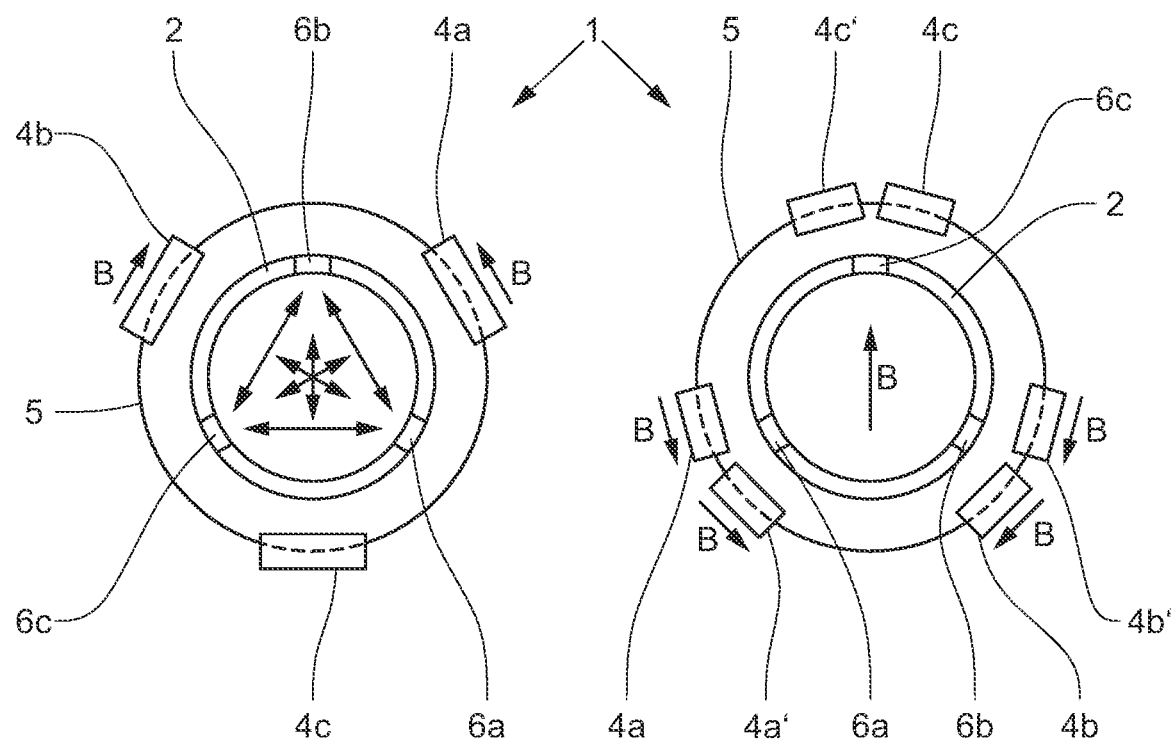
FIG. 7 schematically illustrates embodiments of magnetic-inductive flowmeter operation using magnetic field devices with three and six coils.

FIG. 7 shows two magnetic-inductive flowmeters 1 with exactly three measuring electrodes 6a, 6b, 6c, wherein the three measuring electrodes 6a, 6b, 6c are arranged at angles of about 120° to each other as viewed from the center of the measuring tube 2. In the embodiment on the left, exactly three coils 4a, 4b, 4c are also arranged at angles of about 120° to each other, and the coils 4a, 4b, 4c are arranged at an angle of about 60° to the measuring electrodes 6a, 6b, 6c. To generate the magnetic field B in three operating directions, two of the coils are supplied with current by the control and evaluation unit 7 for each operating direction, and are supplied with current in such a way that they generate opposing magnetic fields B with respect to the magnetic field guiding device 5. The possible magnetic field directions are indicated on the left in FIG. 7, as are the directions of the implemented measuring paths. A multitude of geometrically differently distributed flow information is thus obtained over the cross-section of the measuring tube 2, so that when the flow measurement value Vp is calculated in dependence on all the flow information obtained over the various measuring paths (measurement voltages or sub flow measurement values), a flow measurement value Vp is calculated which is largely independent of the actual flow profile.

The magnetic-inductive flowmeter 1 shown on the right in FIG. 7 also has exactly three measuring electrodes 6a, 6b, 6c, wherein the three measuring electrodes 6a, 6b, 6c are arranged at angles of about 120° to each other as viewed from the center of the measuring tube 2. However, six coils 4a, 4a', 4b, 4b', 4c, 4c' are provided, wherein two each 4a, 4a; 4b, 4b; 4c, 4c' of the six coils 4a, 4a', 4b, 4b', 4c, 4c' have a measuring electrode 6a, 6b, 6c between them as seen from the center of the measuring tube 2, and two measuring electrodes 6a, 6b; 6b, 6c; 6c, 6a each have two coils 4a', 4b; 4b', 4c; 4c', 4a between them. Three 4a, 4b, 4c; 4a', 4b', 4c' of each of the six coils 4a, 4a', 4b, 4b', 4c, 4c' are each arranged at an angle of about 120° to each other and the two coils 4a, 4a; 4b, 4b; 4c, 4c' arranged adjacent to a measuring electrode 6a, 6b, 6c are each arranged at the same angle to the measuring electrode 6a, 6b, 6c. In FIG. 7 on the right, only one energization situation is shown for reasons of clarity. In general, to generate the magnetic field B in one operating direction, four coils 4a, 4a', 4b, 4b', 4c, 4c' are supplied with current by the control and evaluation unit 7, here these are coils 4a, 4a', 4b, 4b', 4c, 4c', which are symmetrical to the axis of the operating direction; in the embodiment, these are coils 4a, 4a' and 4b, 4b'. The measurement voltage U is captured via the measuring path between the measuring electrodes 6a, 6b. In two other operating modes, analogously, 4 of the coils are always supplied with current and a sub measurement voltage is captured, which lies in a measuring path perpendicular to the operating direction of the magnetic field B. Expressed generally, three measuring paths are implemented with the three measuring electrodes 6a, 6b, 6c, wherein the control and evaluation unit 7 generates three magnetic fields B with different operating directions in three operating modes and the control and evaluation unit 7 performs all three operating modes in the measuring sequence MS and obtains three measurement voltages Ui/flow measurement values Vpi from the three measuring paths and obtains an improved flow measurement value Vp from the three measurement voltages Ui/flow measurement values Vpi.

Figure 8:
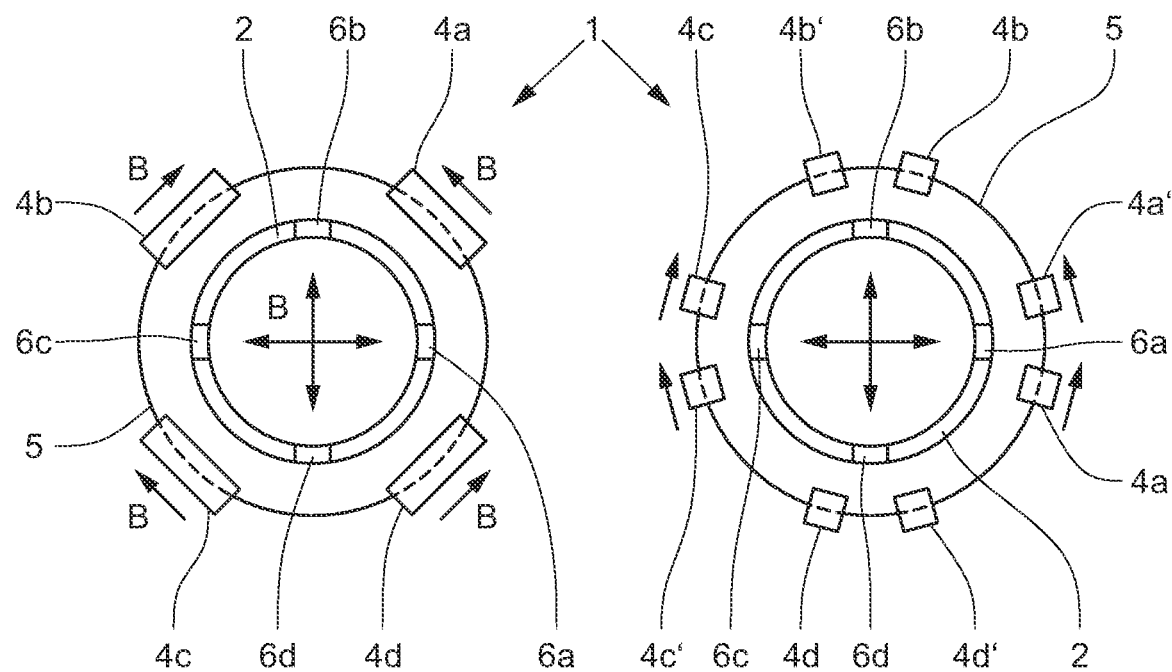
FIG. 8 schematically, embodiments for the operation of magnetic-inductive flowmeters with magnetic field devices with four and eight coils.

FIG. 8 shows magnetic-inductive flowmeters 1 with exactly four measuring electrodes 6a, 6b, 6c, 6d.

The left-hand illustration in FIG. 8 shows a design that is already known in principle from FIG. 2. The four measuring electrodes 6a, 6b, 6c, 6d are arranged at angles of about 90° to each other as seen from the center of the measuring tube 2. Four coils 4a, 4b, 4c, 4d are arranged at angles of about 90° to each other. Furthermore, the four coils 4a, 4b, 4c, 4d are each arranged at an angle of 45° to the measuring electrodes 6a, 6b, 6c, 6d. To generate the magnetic field B in two operating directions, all four coils 4a, 4b, 4c, 4d are respectively supplied with current by the control and evaluation unit 7 for each operating direction. The case shown is that the magnetic field B is generated in the vertical direction.

The right-hand illustration in FIG. 8 shows a design of the magnetic-inductive flowmeter which has exactly four measuring electrodes 6a, 6b, 6c, 6d, wherein the four measuring electrodes 6a, 6b, 6c, 6d, as seen from the center of the measuring tube 2, are arranged at angles of 90° to each other. Eight coils 4a, 4a', 4b, 4b', 4c, 4c', 4d, 4d' are provided, wherein each two 4a, 4a'; 4b, 4b'; 4c, 4c'; 4d, 4d' of the eight coils 4a, 4a', 4b, 4b', 4c, 4c', 4d, 4d' as viewed from the center of the measuring tube 2 have a measuring electrode 6a; 6b; 6c; 6d between them, and wherein two measuring electrodes 6a, 6b; 6b, 6c; 6c, 6d; 6d, 6a each have two coils 4a', 4b; 4b', 4c; 4c', 4d; 4d', 4a between them. 4b, 4b; 4c, 4c; 4d, 4d' are arranged at the same angle to the measuring electrode 6a, 6b, 6c, 6d. The design shows a very high symmetry.

The magnetic-inductive flowmeter 1 shown on the right in FIG. 8 is characterized in that, in order to generate the magnetic field B in an operating direction, at least four coils 4 are supplied with current by the control and evaluation unit 7, namely coils 4 which are symmetrical to the axis of the operating direction. In the embodiment, the vertical operating direction of the magnetic field B generated by energizing the coils 4a, 4a', 4c, 4c' is shown.

In the design of the magnetic-inductive flowmeter 1 on the right in FIG. 8, it has been taken into account that, in order to generate the magnetic field B in one operating direction, exactly four coils 4 are supplied with current by the control and evaluation unit 7, which are located symmetrically to the axis of the operating direction and are spaced farthest from the axis of the operating direction. In this way, broad magnetic fields B can be generated which penetrate a large part of the cross-section of the measuring tube 2.

The invention claimed is:

1. A magnetic-inductive flowmeter, comprising:
   a measuring tube for guiding an electrically conductive medium;
   a magnetic field device including a plurality of coils for generating a magnetic field which passes through the measuring tube at least partially perpendicularly to the flow direction of the medium;
   a magnetic field guiding device for guiding the magnetic field region by region outside the measuring tube with measuring electrodes for tapping at least one measurement voltage induced in the medium; and
   a control and evaluation unit for generating the magnetic field by energizing at least one of the coils and for evaluating the measurement voltage to give a flow measurement value;
   wherein the magnetic field guiding device extends in circumferential direction closed around the measuring tube;
   wherein the coils are arranged distributed over the circumference of the magnetic field guiding device and the magnetic field guiding device acts as a coil core in the region of the coils, so that the coils are also arranged with their coil longitudinal axes in the circumferential direction with respect to the measuring tube; and
   wherein at least three coils and at least three measuring electrodes are provided and wherein each of the measuring electrodes arranged between two coils in the radial direction as viewed from the center of the measuring tube.

2. The magnetic-inductive flowmeter according to claim 1, wherein the magnetic field guiding device forms an arc-shaped curved ring;
   wherein the ring is shaped circularly or elliptically at least in regions, or the magnetic field guiding device forms a polygonal ring;
   wherein the ring forms a hexagonal or octagonal polygon, Baby with alternating long and short legs; and
   wherein the coils are arranged on the long legs.

3. The magnetic-inductive flowmeter according to claim 1, wherein the control and evaluation unit supplies current to at least part of the coils in at least one first operating mode in such a way that the generated magnetic field in the region of the measuring tube is aligned in a first operating direction; and
   wherein the control and evaluation unit supplies current to at least part of the coils in at least one second operating mode in such a way that the generated magnetic field in the region of the measuring tube is aligned in a second operating direction different from the first operating direction.

4. The magnetic-inductive flowmeter according to claim 3, wherein the control and evaluation unit for generating the magnetic field supplies current to a plurality of the coils in each of at least the first operating direction and the second operating direction.

5. The magnetic-inductive flowmeter according to claim 3, wherein the control and evaluation unit implements a change in the current flowing through the coils as steplike as possible; or
   wherein the control and evaluation unit implements a change in the current flowing through the coils sinusoidally.

6. The magnetic-inductive flowmeter according to claim 5, wherein the measuring electrodes are arranged between two coils in radial direction as seen from the center of the measuring tube in such a way that at least a first pair of the measuring electrodes form a first measuring section with a first measuring section direction;
   wherein the first measuring section direction and the first operating direction of the magnetic field are angled more than 45° to each other;
   wherein at least a second pair of the measuring electrodes form a second measuring section with a second measuring section direction; and
   wherein the second measuring section direction and the second operating direction of the magnetic field are angled more than 45° to each other.

7. The magnetic-inductive flowmeter according to claim 6, wherein the control and evaluation unit for determining an improved flow measurement value in a measuring sequence carries out the first operating mode at least once and determines a first measurement voltage and/or first flow measurement value in the first operating mode with the first pair of measuring electrodes, and carries out the second operating mode at least once and determines a second measurement voltage and/or second flow measurement value in the second operating mode with the second pair of measuring electrodes and determines the improved flow measurement value from the first flow measurement value and the second flow measurement value by averaging.

8. The magnetic-inductive flowmeter according to claim 7, wherein the control and evaluation unit in the measuring sequence performs the first operation mode at least twice so that the magnetic field is generated in the one orientation of the first operation direction of the magnetic field and in the other orientation of the first operation direction of the magnetic field, and respective sub measurement voltages/sub flow measurement values are captured at each orientation of the first operation direction of the magnetic field with the first pair of measuring electrodes and the first flow measurement value is calculated from the sub measurement voltages/sub flow measurement values; and
   wherein the control and evaluation unit performs the second operating mode at least twice in the measuring sequence (MS) so that the magnetic field is generated in one orientation of the second operating direction of the magnetic field and in the other orientation of the second operating direction of the magnetic field, and corresponding sub measurement voltages/sub flow measurement values are captured at each orientation of the second operating direction of the magnetic field with the second pair of the measuring electrodes, and the second flow measurement value is calculated from the sub measurement voltages/sub flow measurement values.

9. The magnetic-inductive flowmeter according to claim 8, wherein the control and evaluation unit carries out the measuring sequence, at least intermittently, in such a way that initially the magnetic field is generated successively in the two orientations of the first operating direction or the second operating direction and then successively the magnetic field is generated in the two orientations of the second operating direction or the first operating direction; and
wherein the orientations of the operating directions are also switched alternately several times successively.

10. The magnetic-inductive flowmeter according to claim 8, wherein the control and evaluation unit carries out the measuring sequence, at least intermittently, in such a way that the orientations of at least two operating directions of the magnetic field are switched successively in such a way that, viewed in the axial direction of the measuring tube, a step-wise rotating magnetic field results.

11. The magnetic-inductive flowmeter according claim 3, wherein the control and evaluation unit feeds the coils with current in such a way that the magnetic circuit realized as a whole operates in a linear range; and
wherein a range of magnetic saturation is avoided.

12. The magnetic-inductive flowmeter according to claim 3, wherein the control and evaluation unit supplies current to at least some of the coils in at least one intermediate operating mode in such a way that the generated magnetic field in the region of the measuring tube is aligned in an intermediate operating direction, wherein the intermediate operating direction is aligned differently from the first operating direction in the first operating mode and the second operating direction in the second operating mode and, if appropriate, further operating directions, wherein fewer coils are supplied with current to generate the magnetic field in the intermediate operating direction than are supplied with current to generate the magnetic field in the operating directions.

13. The magnetic-inductive flowmeter according to claim 12, wherein the control and evaluation unit for determining an improved flow measurement value in a measuring sequence determines at least one intermediate measurement voltage/flow measurement value in addition to the measurement voltages/flow measurement values from the least first operating mode and the least second operating mode with a pair of measuring electrodes in the intermediate operating mode and determines the improved flow measurement value from the first measurement voltage/first flow measurement value, the second measurement voltage/second flow measurement value and the intermediate measurement voltage/intermediate flow measurement value by averaging.

14. The magnetic-inductive flowmeter according to claim 3, wherein the control and evaluation unit supplies current to at least some of the coils in at least one intermediate operating mode with currents of different magnitudes, so that the generated magnetic field in the region of the measuring tube is aligned in an intermediate operating direction;
wherein the intermediate operating direction is aligned differently from the first operating direction in the first operating mode and the second operating direction in the second operating mode and optionally further operating directions; and
wherein fewer coils are supplied with current to generate the magnetic field in the intermediate operating direction than are supplied with current to generate the magnetic field in the operating directions.

15. The magnetic-inductive flowmeter according to claim 1, wherein exactly three measuring electrodes are provided;
wherein the three measuring electrodes are arranged at angles of between 90° and 150° to one another as viewed from the center of the measuring tube;
wherein exactly three coils are arranged at angles between 90° and 150° to one another; and
wherein two of the coils are supplied with current by the control and evaluation unit in each case for each operating direction in order to generate the magnetic field in three operating directions.

16. The magnetic-inductive flowmeter according to claim 15, wherein three measuring sections are implemented with the three measuring electrodes; and
wherein the control and evaluation unit generates three magnetic fields with different operating directions in three operating modes and executes all three operating modes in the measuring sequence and obtains three measurement voltages/flow measurement values from the three measuring sections and obtains an improved flow measurement value from the three measurement voltages/flow measurement values.

17. The magnetic-inductive flowmeter according to claim 1, wherein exactly three measuring electrodes are provided;
wherein the three measuring electrodes are arranged at angles of between 90° and 150° to one another as viewed from the center of the measuring tube;
wherein six coils are provided, and in each case two of the six coils as viewed from the center of the measuring tube have one measuring electrode between them and two measuring electrodes each have two coils between them; and
wherein three of the six coils are each arranged at an angle of 120° to one another and the two coils arranged adjacent to a measuring electrode are each arranged at the same angle to the measuring electrode.

18. The magnetic-inductive flowmeter according to claim 17, wherein, in order to generate the magnetic field in an operating direction, at least four coils are supplied with current by the control and evaluation unit; and
wherein that at least four coils lie symmetrically with respect to the axis of the operating direction.

19. The magnetic-inductive flowmeter according to claim 1, wherein exactly four measuring electrodes are provided;
wherein the four measuring electrodes are arranged at angles between 70° and 110° to each other as seen from the center of the measuring tube; and
wherein exactly four coils are arranged at an angle between 70° and 110° to each other, and are arranged at an angle of 35° to 55° to the measuring electrodes; and
wherein, in order to generate the magnetic field in two operating directions, in each case, all four coils are supplied with current by the control and evaluation unit for each operating direction.

20. The magnetic-inductive flowmeter according to claim 1, wherein exactly four measuring electrodes are provided;
wherein the four measuring electrodes are arranged at angles of between 70° and 110° to one another as viewed from the center of the measuring tube;

wherein eight coils are provided;

wherein in each case two of the eight coils, viewed from the center of the measuring tube, have a measuring electrode between them and two measuring electrodes each have two coils between them; and wherein four of the eight coils are arranged at an angle of 90° to one another and the two coils arranged adjacent to a measuring electrode are arranged at the same angle to the measuring electrode.

21. The magnetic-inductive flowmeter according to claim 20, wherein, in order to generate the magnetic field in an operating direction, at least four coils are supplied with current by the control and evaluation unit; and wherein the at least four coils lie symmetrically with respect to the axis of the operating direction.

22. The magnetic-inductive flowmeter according to claim 21, wherein, for generating the magnetic field in an operating direction, exactly four coils are supplied with current by the control and evaluation unit; and wherein the four coils that lie symmetrically with respect to the axis of the operating direction and are spaced farthest from the axis of the operating direction.

23. The magnetic-inductive flowmeter according to claim 1, wherein the control and evaluation unit calculates the volumetric flow of the medium from a linear combination of a plurality of the detected measurement voltages; and wherein the measurement voltages are weighted by weighting factors.

24. The magnetic-inductive flowmeter according to claim 1, wherein the control and evaluation unit calculates the volumetric flow of the medium with a nonlinear function in several of the captured measurement voltages.

25. The magnetic-inductive flowmeter according to claim 24, wherein the nonlinear function is formed by an artificial neural network having an input layer with at least a number of input neurons corresponding to the number of detected measurement voltages as input variables, having an output layer with at least one output neuron for outputting at least the volumetric flow of the medium as output variable, and having at least one intermediate layer with at least two neurons; and wherein the artificial neural network is calibrated with calibration data.

* * * * *